US010402834B2

(12) United States Patent
Aldrey et al.

(10) Patent No.: US 10,402,834 B2
(45) Date of Patent: Sep. 3, 2019

(54) ADVERTISEMENTS WITHIN TELEVISION ADVERTISEMENTS

(75) Inventors: Raul Aldrey, Brookeline, MA (US); Yuriy Bolyukh, Trophy Club, TX (US); Armando P. Stettner, Westford Lane, MA (US); Marcelo Lechner, Burlington, MA (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 1346 days.

(21) Appl. No.: 12/570,246

(22) Filed: Sep. 30, 2009

(65) Prior Publication Data
US 2011/0078023 A1 Mar. 31, 2011

(51) Int. Cl.
*G06Q 30/02* (2012.01)

(52) U.S. Cl.
CPC ......... *G06Q 30/02* (2013.01); *G06Q 30/0257* (2013.01)

(58) Field of Classification Search
CPC .................................................... G06Q 30/00
USPC ................................................ 705/14, 14.55
See application file for complete search history.

(56) References Cited

U.S. PATENT DOCUMENTS

| | | | |
|---|---|---|---|
| 5,825,884 A | 10/1998 | Zdepski et al. | |
| 6,185,619 B1 | 2/2001 | Joffe et al. | |
| 6,219,692 B1 | 4/2001 | Stiles | |
| 6,223,209 B1 | 4/2001 | Watson | |
| 6,298,373 B1 | 10/2001 | Burns et al. | |
| 6,370,580 B2 | 4/2002 | Kriegsman | |
| 7,860,742 B1* | 12/2010 | Gonzalez-Rivas | 705/14.4 |
| 7,975,020 B1* | 7/2011 | Green | G06Q 30/0241 705/14.4 |
| 2002/0069405 A1* | 6/2002 | Chapin | H04N 7/162 725/32 |
| 2002/0120498 A1 | 8/2002 | Gordon et al. | |
| 2003/0149983 A1* | 8/2003 | Markel | H04N 7/088 725/51 |
| 2007/0088821 A1* | 4/2007 | Sankuratripati et al. | 709/224 |
| 2008/0021775 A1* | 1/2008 | Lerman | G06Q 30/02 705/14.73 |

(Continued)

FOREIGN PATENT DOCUMENTS

| | | | | |
|---|---|---|---|---|
| EP | 0875843 A1 * | 4/1998 | | G06F 17/30 |
| EP | 0875873 A1 | 11/1998 | | |

OTHER PUBLICATIONS

Scanscout: Guest Blog Post: How to Maximize Revenue using Different instream video ad units. Published Jul. 29, 2009. Available at https://www.brightcove.com/en/blog/2009/07/guest-blog-post-how-maximize-revenue-using-different-instream-video-ad-units. (Year: 2009).*

Primary Examiner — Katherine Kolosowski-Gager

(57) ABSTRACT

One or more devices send, over a network, an advertisement for presentation by a video client, where the advertisement includes a trigger for secondary advertising content that is presented, within a hotspot designated in the primary advertisement, as part of the primary advertisement. The one or more devices receive, via the network, a notification from the video client that a user has selected the trigger and determine, based on the notification, particular secondary advertising content to be presented to the user. The one or more devices send, over the network, instructions to the video client to retrieve the particular secondary advertising content for presentation to the user.

23 Claims, 10 Drawing Sheets

(56) References Cited

U.S. PATENT DOCUMENTS

| | | | |
|---|---|---|---|
| 2008/0022300 A1* | 1/2008 | Angiolillo | H04N 7/17318 |
| | | | 725/32 |
| 2008/0114645 A1* | 5/2008 | Zalewski | G06Q 30/02 |
| | | | 705/14.5 |
| 2009/0132373 A1* | 5/2009 | Redlich | 705/14 |
| 2009/0158316 A1* | 6/2009 | Kokernak et al. | 725/32 |
| 2010/0145765 A1* | 6/2010 | Kantarek | G06Q 30/02 |
| | | | 705/7.32 |

* cited by examiner

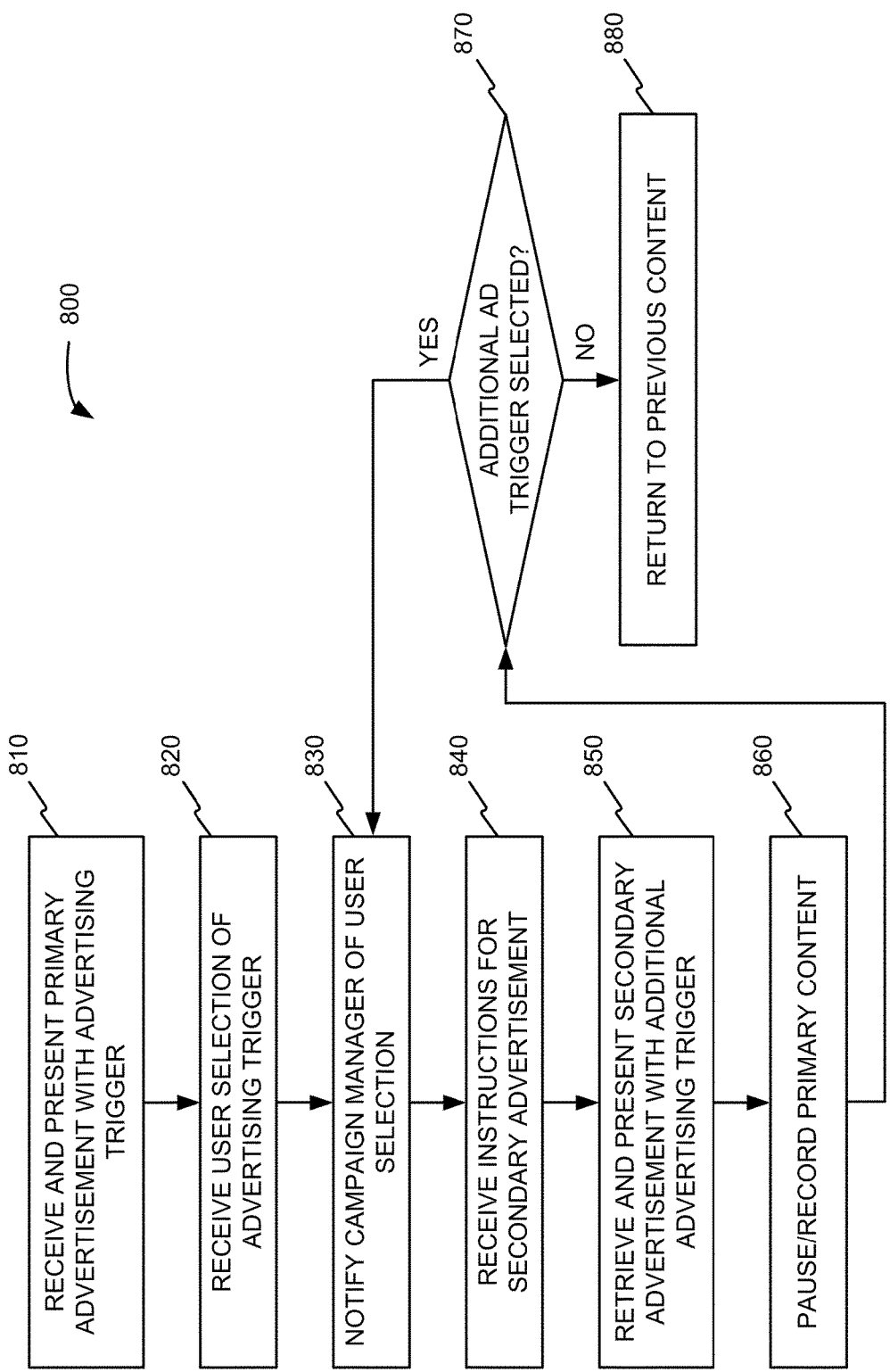

ADVERTISEMENTS WITHIN TELEVISION ADVERTISEMENTS

BACKGROUND INFORMATION

As media outlets proliferate and viewing audiences become more fragmented, advertisers, such as television advertisers, are having greater difficulty capturing and holding viewer attention. Consequently, it is more critical than ever that advertisements be inventive and reach beyond a traditional linear format.

BRIEF DESCRIPTION OF THE DRAWINGS

FIG. 8 is a flow chart illustrating an another exemplary process for providing telescoping advertising.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may enable advertisements to be placed within other advertisements within a television viewing environment. As described further herein, the advertisements may be presented in a telescoping manner that makes advertising more interesting and useful for viewers, while enabling advertisers to cross-leverage advertisements, promote strategic consumer product combinations, and engage in multi-sponsor revenue/cost sharing.

Figure 1:
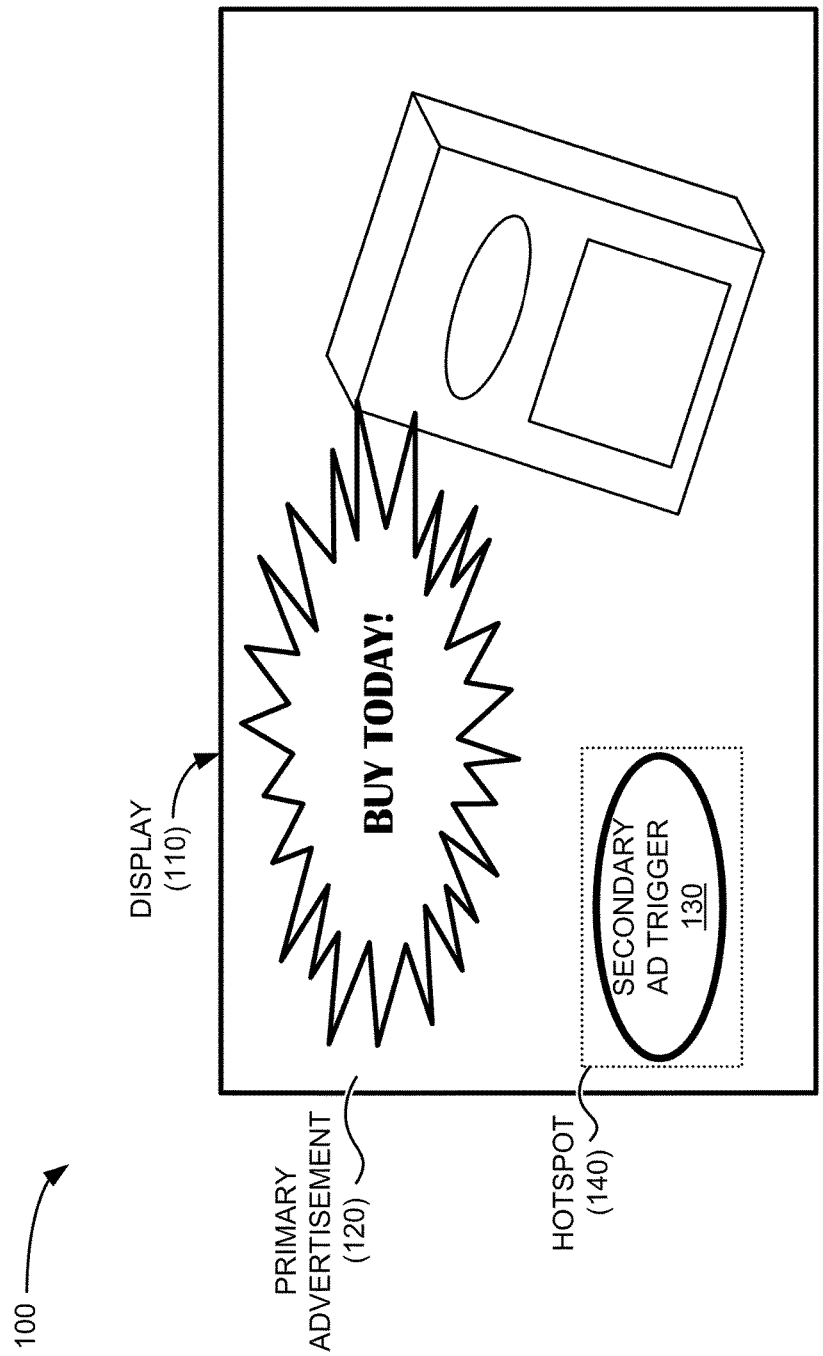
FIG. 1 illustrates an exemplary environment for presenting advertising within television advertising.

FIG. 1 illustrates an exemplary environment 100 for presenting advertising within television advertising. As shown in FIG. 1, a display 110 may include a primary advertisement 120 and a secondary advertisement ("ad") trigger 130. In one implementation, primary advertisement 120 may include a television advertisement presented within a linear format (e.g., presented in a broadcast sequence without any navigation control from the viewer). In other implementations, primary advertisement 120 may be retrieved (e.g., from a menu of stored advertisements) and presented to a user on demand.

Secondary advertisement trigger 130 may include an icon, image, text, and/or another visible indicator that may be used to solicit input from a user. In one implementation, secondary advertisement trigger 130 may present a viewer with opportunities to explore secondary products or services. For example, secondary advertisement trigger 130 may include an indicator of a product that may be associated with the subject of primary advertisement 120. As an illustration, primary advertisement 130 may promote an automobile and secondary advertisement trigger 130 may promote an in-dash sound system or a dash-mounted global positioning device. As another illustration, primary advertisement 120 may promote a retail establishment, such as a department or discount store, and secondary advertisement trigger 130 may include any good or service sold by the retail establishment. Secondary advertisement trigger 130 may provide a visual cue to a viewer that certain input (e.g., an appropriate keystroke on a remote control) may launch a secondary advertisement. Secondary advertisement trigger 130 may be visible for all or a portion of the time that primary advertisement 120 is shown. In some implementations, secondary advertisement trigger may also remain visible for a period of time after the primary advertisement is completed.

Primary advertisement 120 may include a hotspot 140. Hotspot 140 may be a designated space within primary advertisement 120 that may be configured to receive secondary advertisement trigger 130. In an exemplary implementation, the location of hotspot 140 may be repositioned within display 110 as primary advertisement 120 is shown. As an illustration, primary advertisement 120 for an automobile may present an icon overlaid on a sound system shown within the automobile interior such that the hotspot 140 (and associated secondary advertisement trigger) may track the location of the sound system on display 110. Hotspot 140 may be configured to receive one or more secondary advertisement triggers 130. In one implementation, hotspot 140 may include different secondary advertisement triggers at different times, such that multiple secondary advertisement triggers 130 may be presented within the same hotspot during the presentation of a single primary advertisement 120. In another implementation, primary advertisement 120 may include multiple hotspots 140.

In operation, when a viewer selects secondary advertisement trigger 130, the primary advertisement may be interrupted and secondary advertising content may be presented to the viewer. The secondary advertising content may include a linear advertisement with additional hotspots and triggers to tertiary advertisements, allowing the user to selectively view a logical tree of potentially related advertisements. In other implementations, the secondary advertising content may include an interactive application or other multimedia content. Thus, implementations described herein may provide a seamless transition between linear and non-linear (e.g., interactive) advertising content. In implementations described herein, the viewer may navigate back through the tree of previous advertisements and/or return directly to the original broadcast programming. In another implementation, the display of linear broadcast programming may be paused and automatically recorded when a user first selects secondary advertisement trigger 130 so as to gracefully return a viewer to the broadcast programming once the user has finished navigating the advertising tree.

As used herein, the term "video client" may refer to any media processing device that may receive multimedia content over a network, and may provide such multimedia content to an attached video display device (such as a television or computer monitor). A "subscription multimedia service," as used herein, may refer to television, telephone, networking and/or other multimedia services provided to customers over a closed distribution network, such as cable, optical fiber, satellite, or virtual private networks. Also, as used herein, the terms "user," "viewer," "subscriber," and "customer" may refer interchangeably to a person who interacts with, orders, uploads, listens to, or plays multimedia content over a subscription multimedia service.

Figure 2:
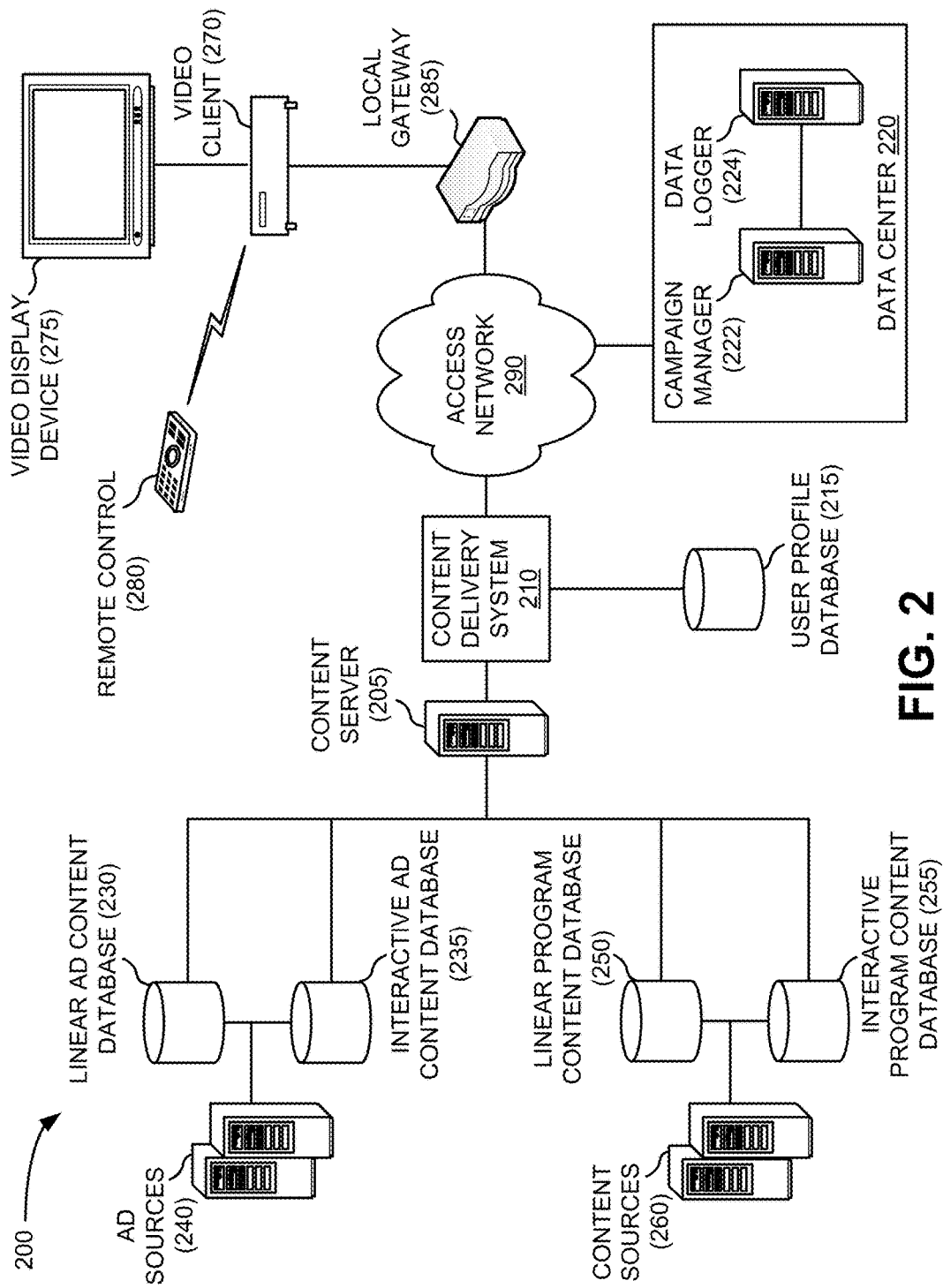
FIG. 2 depicts an exemplary network in which systems and/or methods described herein may be implemented.

FIG. 2 is a diagram of an exemplary network 200 in which systems and/or methods described herein may be implemented. As illustrated, network 200 may include a content server 205, a content delivery system 210, a user profile data source 215, a data center 220 that includes a campaign manager 222 and a data logger 224, linear advertising content database 230, interactive advertising content database 235, advertising sources 240, linear program content database 250, interactive program content database 255, content sources 260, a video client 270, a video display device 275, a remote control 280, a local gateway 285, and an access network 290. Video client 270, video display device 275, remote control 280, and local gateway 285 may be located at a customer's premises and may be connected via access network 290 to content delivery system 210 and/or content server 205 at, for example, a subscription multimedia service provider's premises. Components of network 200 may interconnect via wired and/or wireless connections.

For simplicity, one content server 205, one content delivery system 210, one user profile data source 215, one data center 220, one campaign manager 222, one data logger 224, one linear advertising content database 230, one interactive advertising content database 235, one set of advertising sources 240, one linear program content database 250, one interactive program content database 255, one set of content sources 260, one video client 270, one video display device 275, one remote control 280, one local gateway 285, and one access network 290 have been illustrated in FIG. 2. In practice, there may be more networks, servers, databases, gateways, video clients, and/or video display devices. Also, in some instances, one or more of the components of network 200 may perform one or more functions described as being performed by another one or more of the components of network 200.

Content server 205 may include one or more devices for providing content/information to video client 270 and/or video display device 275 in accordance with requests that are issued from video client 270. Examples of content server 205 may include a headend device that provides pay-per-view (PPV) events, a video-on-demand (VOD) device or another device that provides multimedia content upon request, an advertising server that provides advertising associated with multimedia content, and/or a program guide information server that provides information related to multimedia content available to video client 270. Content server 205 may communicate with a variety of other components within network 200, such as devices within content delivery system 210, linear advertising content database 230, interactive advertising content database 235, linear program content database 250, and/or interactive program content database 255, to provide requested multimedia services to customers. Thus, content server 205 may provide advertising content and/or program (or "asset") content depending on customer viewing activities. Content server 205 may also receive information (via content delivery system 210) from one or more video clients 270, such as user selections of secondary/tertiary advertisements. In some implementations, content server 205 may retrieve advertising content that has been specifically requested by video client 270.

While shown as a single server component in FIG. 2, in other implementations, content server 205 may be distributed among multiple servers. For example, content server 205 may be split as a separate advertising content server and a separate program content server.

Content delivery system 210 may include one or more components to deliver broadcast and other multimedia content to video client 270. In general, content delivery system 210 may provide control over (e.g., via access network 290) television services for devices, such as video clients 270, video display devices 275, and/or other network connectivity devices (e.g., personal computers, not shown) provided at the customer's premises. Content delivery system 210 may include, for example, video hub offices (VHOs), databases, gateways, servers, network switches, and/or routers that may be connected by wired and/or wireless connections. Content delivery system 210 may serve as a link between a video client 270 and content server 205 to enable delivery of on-demand multimedia content, advertising, applications, etc. For example, content delivery system 210 may facilitate communications between content server 205 and video client 270 via access network 290. In one implementation, content delivery system 210 may combine broadcast programming content with advertising content (retrieved, e.g., from content server 205) to provide a combined linear program content/advertising stream to video client 270. In some implementations, content delivery system 210 may also collect information from video clients 270 that may be used, for example, to generate user profiles.

User profile database 215 may include data for video client 270 or groups of video clients that may be used to provide targeted advertising. For example, advertisements may be assigned a unique advertising identifier that may be cross-referenced to particular demographics, interests, or other indicators that may be obtained from user profiles. Advertisers may classify particular advertising content based on demographic groups, common interests, and/or other information that can be used in determining particular video clients 270 (or groups of video clients) to which to direct the advertising content. Content delivery system 210 may retrieve user profile information from user profile database 215 and retrieve advertising content from content server 205 that has been classified to correspond to the user profile tendencies.

Data center 220 may include one or more entities that are capable of collecting data and performing statistical analysis on user activity of video client 270 and other video clients. Data center 220 may combine related data into groups of accounts based on, for example, pattern analysis and correlation. In implementations described herein, data center 220 may include campaign manger 222 and data logger 224.

Campaign manager 222 may include one or more server entities, or other types of computation or communication devices, that gather, process, search, and/or provide information in a manner described herein. Campaign manager 222 may receive notifications of user activity from video client 270 and may determine appropriate responses to the user activity. In one implementation, campaign manager 222 may access a dynamic set of advertising campaign rules, user profile information, and/or prevailing environmental/contextual metrics (e.g., time of day, program being viewed, etc.) that may be used to select particular secondary advertising when a user selects a secondary advertisement trigger.

Data logger 224 may include one or more memory devices that maintain a selection history (such as user selections of secondary advertisements) of video client 270. In one implementation, data logger 224 may include exemplary fields, such as a user-identification field, a date field, a time field, a primary advertisement code field, a secondary advertisement code field, and/or a program content identification field. Data logger 224 may include multiple databases stored locally at data center 220 and/or stored at one or more different and possibly remote locations. Data logger 225 may group customers' selection histories, for example, by individual users, user groups, product type, etc. Information from data logger 224 may be retrieved by a backend server (or another server device) within, for example, content delivery system 210 to monitor advertising data, such as viewer response rates, revenue, etc.

Linear advertising content database 230 may include one or more memory devices that receive and maintain linear advertising content from advertising sources 240. Linear advertising content may include, for example, advertising content that may be inserted within a break in linear programming (e.g., a conventional commercial break in broadcast programming). In one implementation, linear advertising content may include a primary advertisement (e.g., primary advertisement 120) with an integrated trigger to secondary advertising (e.g., secondary advertisement trigger 130).

Interactive advertising content database 235 may include one or more memory devices that receive and maintain interactive advertising content from advertising sources 240. Interactive advertising content may include, for example, non-linear advertising that may be presented, for example, based directly or indirectly on user input to video client 270. Non-linear advertising may include, for example, interactive applications, widgets, and/or other multimedia that may not be time-restricted.

Advertising sources 240 may include one or more server entities, or other types of computation or communication devices, that gather, process, search, and/or provide information in a manner described herein. Advertising sources 240 may provide linear and interactive advertising content to linear advertising content database 230 and/or interactive advertising content database 235. In an exemplary implementation, advertising sources 240 may be controlled by one or more different entities than the entity that controls linear advertising content database 230 and/or interactive advertising content database 235 (e.g., the subscription multimedia service provider).

Linear program content database 250 and interactive program content database 255 may each include one or more memory devices that receive and maintain linear program content and interactive program content, respectively, from content sources 260. Linear program content may include, for example, video-on-demand programming. Interactive program content may include non-linear programming that may be selected and/or controlled by a user, such as interactive applications, games, etc.

Content sources 260 may include one or more server entities, or other types of computation or communication devices, that gather, process, search, and/or provide information in a manner described herein. Content sources 260 may provide linear and interactive program content to linear program content database 250 and/or interactive program content database 255. In an exemplary implementation, content sources 260 may be controlled by one or more different entities than the entity that controls linear program content database 250 and/or interactive program content database 255 (e.g., the subscription multimedia service provider).

Video client 270 may include any device capable of receiving, transmitting, and/or processing information to and/or from access network 290. In one implementation, video client 270 may be a closed device (e.g., including a hardware/software configuration that is not accessible to the general public). Video client 270 may provide video signals to video display device 275. Examples of video client 270 may include a set-top box, a computer, a cable card, and/or a portable electronic device. Video client 270 may receive a television signal from gateway 285, may convert the signal to a form usable by video display device 275, and may transmit the signal to video display device 275 for display. Video client 270 may further allow a user to provide user input for interactive television applications (e.g., to navigate menu displays or select menu items) and to alter the programming provided to video display device 275 based on a signal (e.g., a channel up or channel down signal) from, for example, remote control 280. In one implementation, video client 270 may support interfaces using Enhanced TV Binary Interchange Format (EBIF). Video client 270 may also be capable of sending data to a backend server (e.g., content server 205, campaign manager 222, and/or a device within content delivery system 210) via access network 290. In an exemplary implementation, video client 270 may also include an integrated digital video recorder (DVR) that may enable video client 270 to store linear program/advertising content for later retrieval/presentation to a user. In some implementations, video client 270 may be incorporated into video display device 275.

Video display device 275 may include a digital or analog display via which a user may view multimedia content (including, for example, conventional programming, interactive displays, and/or advertising). Video display device 275 may refer to any device that can receive and display multimedia content delivered over access network 290 and/or through video client 270 for perception by users. Video display device 275 may include technologies, such as cathode ray tube (CRT) displays, liquid crystal displays (LCDs), light-emitting diode (LED) displays, plasma displays, etc.

Remote control 280 may include a range of devices including function specific keys, number keys, and/or a full-text key pad. A user may interact with video client 270 using a keypad that is part of the remote control, and signals representing key depressions may be transmitted to video client 270 via an infrared transmission or another type of transmission. Remote control 280 may allow a user to select advertising triggers, navigate a program guide, select channels or programs for viewing, adjust display characteristics, and/or perform other interactive functions related to viewing multimedia-type content provided over a network. In one implementation, video client 270 may allow a user to selectively activate an advertising trigger for a secondary, tertiary, or additional advertisement by using remote control 280. For example, remote control 280 may include an "A," a "B," and a "C" shortcut button, where pressing each button may activate a corresponding advertising trigger. As another example, arrow keys and/or a "Select" button on remote control 280 may be used to selectively highlight and activate advertising triggers.

Local gateway 285 may include a network device that provides an interface from access network 290 to video clients 270 and/or other network connectivity devices (not shown). For example, when telecommunication services are provided to a customer's premises via an optical fiber, gateway 285 may include an optical network terminal (ONT) that connects to the optical fiber. The ONT may convert between signals appropriate for video display device 275 and signals appropriate for transmission over optical fiber. For example, the ONT may include a coaxial cable connection that leads to video display device 275 or video client 270. The ONT may also include an Ethernet output port that connects to a personal computer or a voice over Internet protocol (VoIP) telephone and/or a standard telephone port for connecting to a standard telephone. Gateway 285 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

Access network 290 may include a video signaling and distribution network and system that permit transfer of data between content delivery system 210 and video clients 270. Additionally, access network 290 may include, among other things, a firewall, a filtering mechanism, a proxy, and/or network address translation mechanisms. Access network 290 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 290 may provide customers with multimedia content provided, for example, by content server 205 and/or content delivery system 210.

In implementations described herein, video client 270 may receive programming from content delivery system 210. The programming may include a primary advertisement that includes a trigger for secondary advertising. Video client 270 may display the primary advertisement 270 to a user via video display device 275. During presentation of the primary advertisement, a user may select, via remote control 280, the trigger to the secondary advertising. Video client 270 may provide an indication of the selection to campaign manager 222 via access network 290. Campaign manager 222 may identify an appropriate response to the user input based on, for example, the user selection, user profile data, and/or contextual metrics (e.g., time of day, program being viewed, etc.). The appropriate response may include, for example, identification of a particular secondary advertisement to display or identification of an executable application to run. To present the identified advertisement/application to the user, video client 270 may retrieve the identified advertisement/application from an internal memory or may send a request to content server 205 for the identified advertisement/application.

Figure 3:
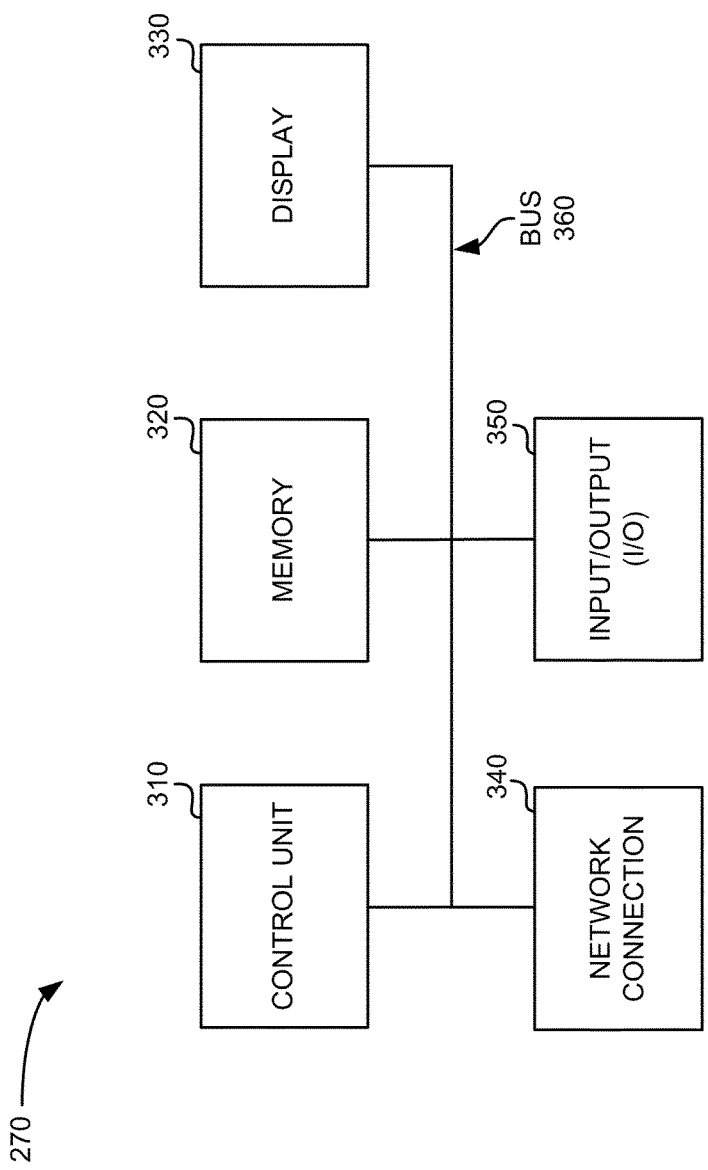
FIG. 3 is a block diagram of exemplary components of a video client that may be used in the network of FIG. 2.

FIG. 3 is diagram illustrating exemplary components of video client 270. As shown, video client 270 may include a control unit 310, a memory 320, a display 330, a network connection 340, an input/output (I/O) component 350, and a bus 360.

Control unit 310 may include one or more processors, microprocessors, or another type of processing logic that interprets and executes instructions. Among other functions, control unit 310 may collect and store viewer input associated with television programming/advertising. Control unit 310 may execute instructions to send viewer input to another device, such as campaign manager 222. Control unit 310 may also receive information and/or instructions from other devices, such as campaign manager 222 and/or content delivery system 210.

Memory 320 may include one or more dynamic or static storage devices that may store information and instructions for execution by control unit 310. For example, memory 320 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 320 may store a viewer activity log to send at a later point in time, such as when requested by campaign manager 222.

Display 330 may include any component capable of providing visual information. For example, in one implementation, display 330 may be a light emitting diode (LED) or a liquid crystal display (LCD). In another implementation, display 330 may use another display technology, such as a dot matrix display, etc. Display 330 may display, for example, text (such as a time, a date, or a channel selection), images, and/or video information.

Network connection 340 may include any transceiver-like mechanism that enables video client 270 to communicate with other devices and/or systems, such as content delivery system 210 and/or campaign manager 222. For example, network connection 340 may include an Ethernet interface, an optical interface, a coaxial interface, a radio interface, or the like. Network connection 340 may allow for wired and/or wireless communication.

Input/output devices 350 may generally include user input devices, such as external buttons, and output devices, such as LED indicators. With input/output devices 350, a user may generally interact with video client 270. In some implementations, input/output devices 350 may be implemented via a remote control (e.g., remote control 280). Bus 360 may provide an interface through which components of video client 270 can communicate with one another.

As will be described in detail below, video client 270 may perform certain operations relating to displaying information and communicating viewer activities to a server, such as campaign manager 222. Video client 270 may perform these operations in response to control unit 310 executing software instructions contained in a computer-readable medium, such as memory 320. A computer-readable medium may be defined as a physical or logical memory device. A logical memory device may refer to memory space within a single, physical memory device or spread across multiple, physical memory devices. The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of video client 270, in other implementations, video client 270 may include fewer, different, differently arranged, or additional components than those depicted in FIG. 3. In still other implementations, one or more components of video client 270 may perform one or more other tasks described as being performed by one or more other components of video client 270.

Figure 4:
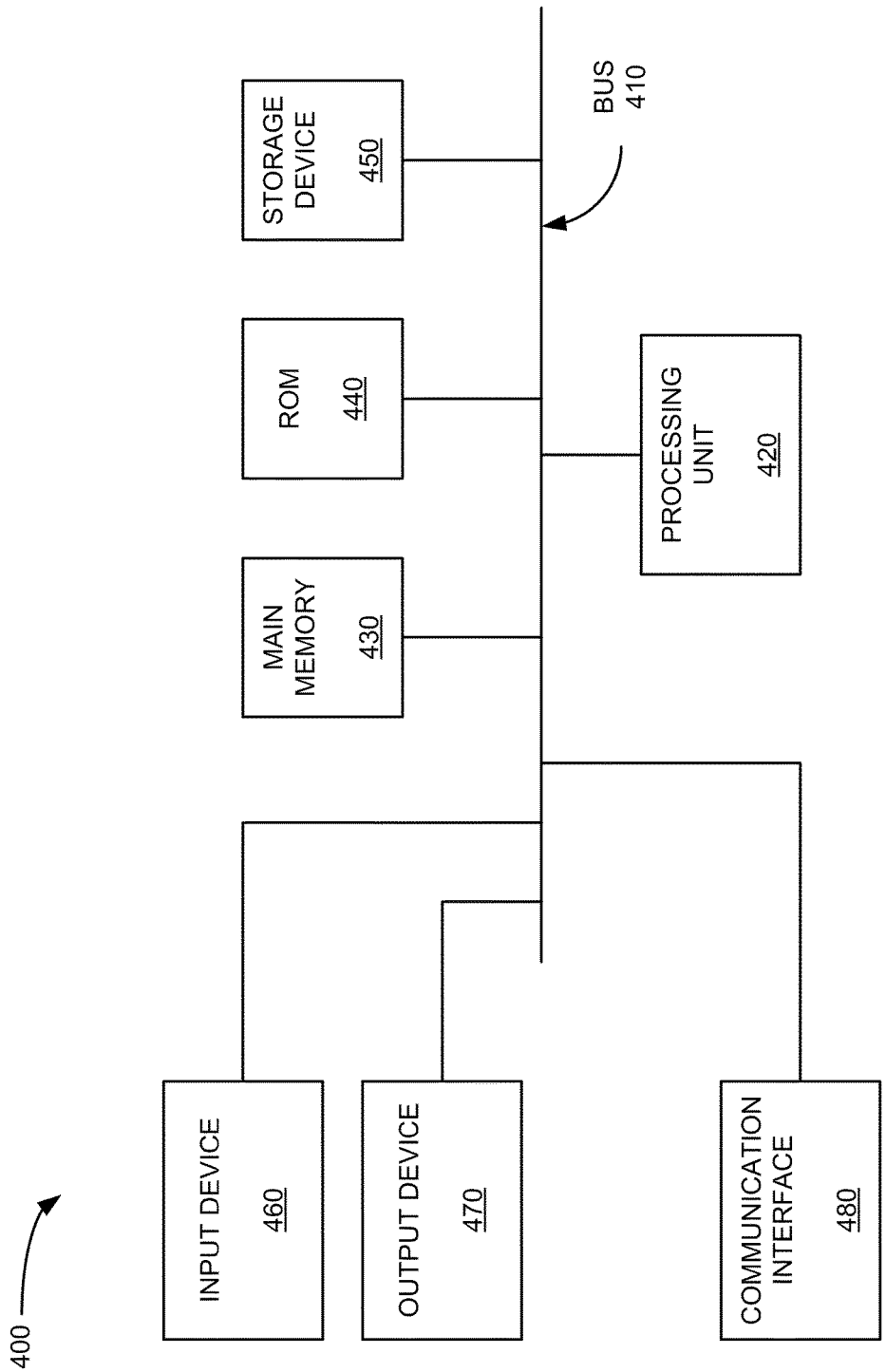
FIG. 4 is a block diagram of exemplary components of a device that may correspond to a content server and/or a campaign manager of FIG. 2.

FIG. 4 is a diagram of exemplary components of a device 400 that may correspond to content server 205 and/or campaign manager 222. In some implementations, device 400 may also correspond to one or more of data logger 224, advertising sources 240, content sources 260, and certain components of content delivery system 210. As illustrated, device 400 may include a bus 410, a processing unit 420, a main memory 430, a read-only memory (ROM) 440, a storage device 450, an input device 460, an output device 470, and a communication interface 480.

Bus 410 may include a path that permits communication among the components of device 400. Processing unit 420 may include one or more processors, microprocessors, or other types of processing units, such as application-specific integrated circuits (ASICs), field-programmable gate arrays (FPGAs), etc., that may interpret and execute instructions.

Main memory 430 may include a RAM or another type of dynamic storage device that stores information and instructions for execution by processing unit 420. ROM 440 may include a ROM device or another type of static storage device that may store static information and instructions for use by processing unit 420. Storage device 450 may include a magnetic and/or optical recording medium and its corresponding drive. Storage device 450 may store viewer transaction history for particular video clients 270 and/or all video clients 270 associated with a subscription multimedia service provider.

Input device 460 may include a mechanism that permits an operator to input information to device 400, such as a keyboard, a mouse, a pen, voice recognition and/or biometric mechanisms, a touch-screen interface, etc. Output device 470 may include a mechanism that outputs information to the operator, including a display, a printer, a speaker, etc. Communication interface 480 may include any transceiver-like mechanism that enables device 400 to communicate with other devices and/or systems, such as video client 270.

As will be described in detail below, device 400 may perform certain operations associated with providing telescoping advertising for a subscription multimedia service. Device 400 may perform these and other operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 4 illustrates exemplary components of device 400, in other implementations, device 400 may include fewer, different, differently arranged, or additional components than those depicted in FIG. 4. In still other implementations, one or more components of device 400 may perform one or more other tasks described as being performed by one or more other components of device 400.

Figure 5:
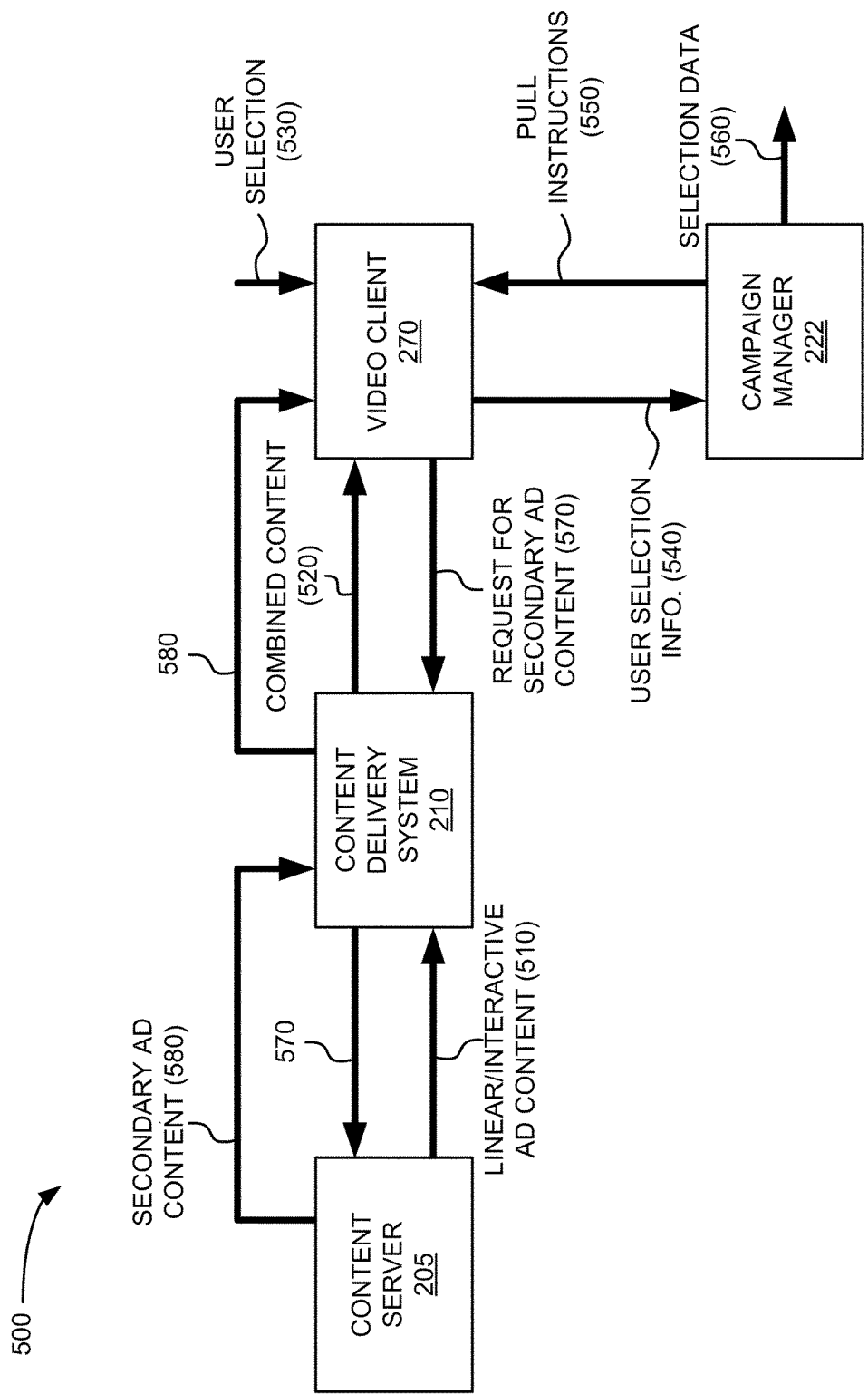
FIG. 5 depicts a diagram of exemplary interactions among components of an exemplary portion of the network illustrated in FIG. 2.

FIG. 5 depicts a diagram of exemplary interactions among components of an exemplary portion 500 of network 200. As illustrated, exemplary network portion 500 may include content server 205, content delivery system 210, video client 270, and campaign manager 222. Content server 205, content delivery system 210, video client 270, and campaign manager 222 may include the features described above in connection with, for example, FIG. 2.

As further shown in FIG. 5, content server 205 may provide linear/interactive advertising content 510 to content delivery system 210. Content server 205 may retrieve linear/interactive advertising content 510, for example, from linear advertising content database 230 and/or interactive advertising content database 235. In some implementations, content server 205 may also provide linear/interactive program content (not shown) to content delivery system 210. Content server 205 may retrieve linear/interactive program content, for example, from linear program content database 250, and/or interactive program content database 255.

Content delivery system 210 may combine linear/interactive advertising content 510 with broadcast program content (e.g., received by content delivery system 210 from outside sources) or other program content (e.g., also received from content server 205) to form combined content 520. Combined content 520 may be forwarded to video client 270. For example, in one implementation, content delivery system 210 may combine linear advertising content with linear broadcast content and send the combined content 520 to video client 270 via access network 290. The combined content 520 may be provided as a single video stream that includes a primary advertisement (e.g., primary advertisement 120) with an integrated trigger to a secondary advertisement (e.g., secondary advertisement trigger 130). In another implementation, content delivery system 210 may provide a primary advertisement that may later be associated with interactive program content by video client 270.

Video client 270 may receive the combined content 520 and may cause the combined content to be displayed to a user (e.g., via video display device 275). When the primary advertisement with an integrated trigger to a secondary advertisement is displayed, a user may provide a user selection 530 to the video client. User selection 530 may be provided via a remote control (e.g., remote control 280) to select the trigger to the secondary advertisement.

Video client 270 may identify user selection 530 and associate user selection 530 with an identification code for the primary advertisement and an identification code associated with the trigger for the secondary advertisement. Video client 270 may compile the primary advertisement identification code, the identification code associated with the trigger for the secondary advertisement, current channel/program information, user/device identification information, and/or other contextual information, and send the compiled information to campaign manager 222, as indicated by reference number 540.

Campaign manager 222 may determine an appropriate response to the user selection information based on, for example, a dynamic set of ad campaign rules and/or user profile information and prevailing environmental/contextual metrics (e.g., time of day, program being viewed, etc.). Campaign manager 222 may provide instructions to video client 270, as indicated by reference number 550. Campaign manager 222 may, for example, instruct video client 270 to pull additional advertising media (e.g., a secondary advertisement) from content server 205 and/or an executable application for presentation to the user. Additionally and/or alternatively, campaign manager 222 may determine the appropriate response to the user selection information and provide instructions to content server 205 and/or content delivery system 210 to send the required additional advertising media to video client 270.

In an exemplary implementation, campain manager 222 may also capture metrics regarding the user selection information 540. For example, campaign manager 222 may identify selection data, such as user selections, advertisement codes, contextual parameters, and/or other information that may be relevant to advertisers and/or system managers. Campaign manager 222 may send the selection data to another location, such as data logger 224, for storage, as indicated by reference number 560.

Upon receipt of pull instructions 550, video client 270 may send a request for secondary advertising content 570 to content server 205 via content delivery system 210. In response to the request for secondary advertising content 570, content server 205 may retrieve the requested secondary advertisement (e.g., from linear advertising content database 230 and/or interactive advertising content database 235) and provide the requested secondary advertisement to video client 270 via content delivery system 210, as indicated by reference number 580. Alternatively and/or additionally video client 270 may pre-fetch secondary advertising content and retrieve a selected advertisement from a local memory cache (e.g., from memory 320).

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
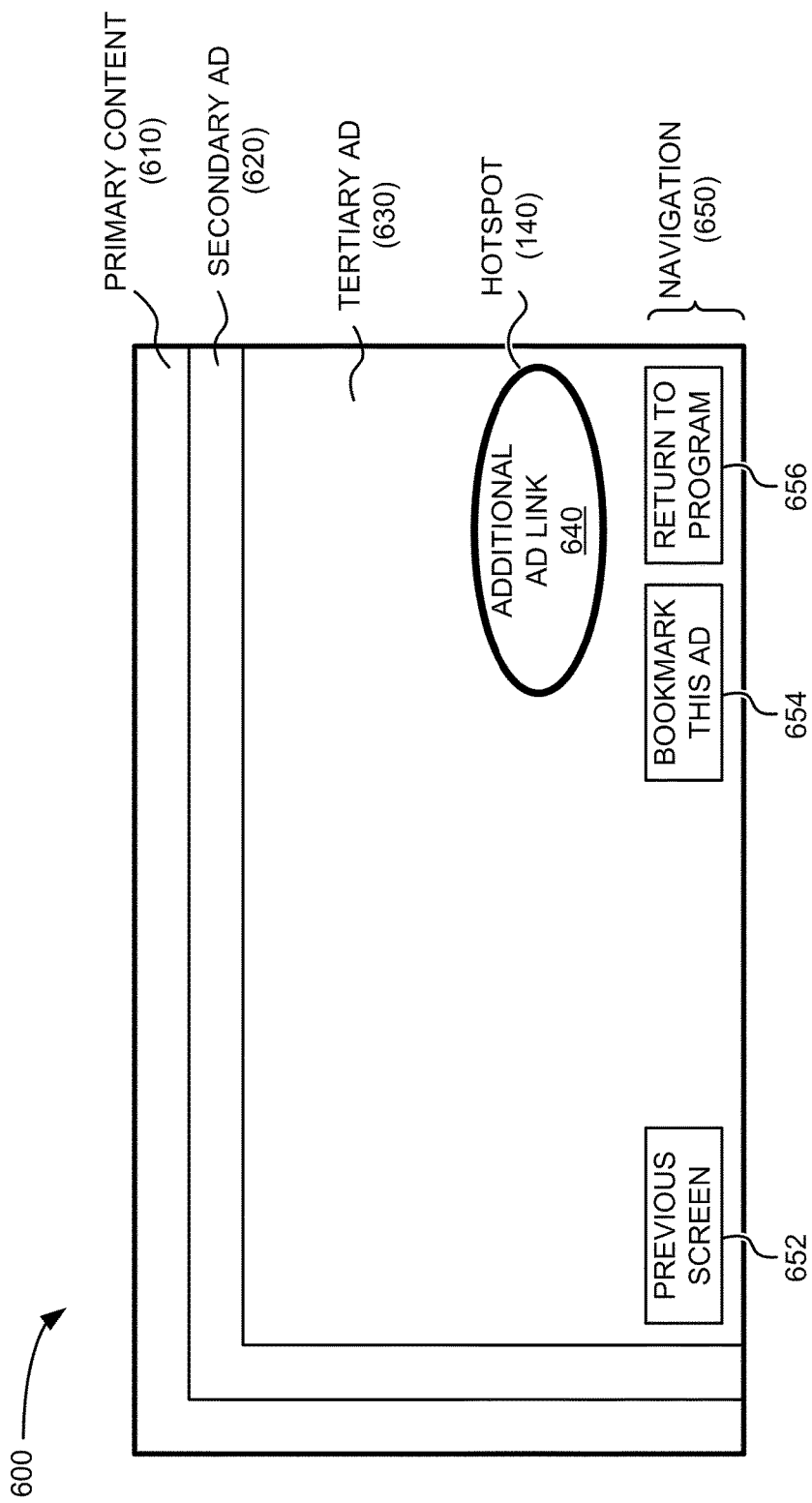
FIG. 6 illustrates a diagram of an exemplary on-screen display format including telescoping advertisements according to an implementation described herein.

FIG. 6 illustrates a diagram of an exemplary on-screen display format 600 including telescoping advertisements according to an implementation described herein. In the implementation of FIG. 6, assume a user has progressed through a selection of at least two non-linear advertisements. As shown in FIG. 6, display format 600 may include a primary content section 610, a secondary advertisement section 620, a tertiary advertisement section 630 with an additional advertisement trigger 640, and a navigation overlay 650.

Primary content section 610 may include a display of a primary advertisement (e.g., primary advertisement 120, not shown) that includes a secondary advertisement trigger (e.g., secondary advertisement trigger 130, not shown). Primary content section 610 may include, for example, the full area of display 600. However, upon a user's selection of a secondary advertisement trigger, all or a portion of primary content section 610 may be covered by an overlay of secondary advertisement section 620. In one implementation, primary content section 610 may include paused video displayed within primary content section 610 upon the user's selection of a secondary advertisement trigger.

Secondary advertisement section 620 may be overlaid over all or a portion of primary content section 610. Secondary advertisement section 620 may include a display of a secondary advertisement (e.g., secondary advertising content 580) based on a user's selection of a secondary advertisement trigger from the primary advertisement of primary content section 610. The secondary advertisement within secondary advertisement section 620 may also include an additional advertisement trigger. Upon a user's selection of the additional advertisement trigger, all or a portion of secondary advertisement section 620 may be covered by an overlay of tertiary advertisement section 630. In one implementation, secondary advertisement section 620 may include paused video displayed within secondary advertising section 620 upon the user's selection of the additional advertisement trigger.

Tertiary advertisement section 630 may be overlaid over all or a portion of primary secondary advertisement section 620. Tertiary advertisement section 630 may include a display of another advertisement (e.g., retrieved in a manner similar to secondary advertising content 580) based on a user's selection of the additional advertisement trigger from the secondary advertisement of secondary advertisement section 620. Tertiary advertisement section 630 may include an additional advertisement trigger 640 and a navigation overlay 650 that includes a previous screen selector 652, a bookmark selector 654, and a return to program selector 656. Additional advertisement trigger 640 may be included within hotspot 140 and may be selected by the user to display another advertisement that may be presented in a subsequent overlay section of display 600.

Navigation overlay 650 may be presented to a user over any current section (e.g., secondary advertisement section 620 or tertiary advertisement section 630) within a telescoping advertising sequence to permit the user to easily return to previous displays. Previous screen selector 652 may be selected by a user (e.g., via remote control 280) to return to the previously-selected section in display 600. In the example of FIG. 6, selection of previous screen selector 652 may close tertiary advertisement section 630 to permit a user to view secondary advertisement section 620. Bookmark selector 654 may be selected by a user to store the currently presented advertisement for later retrieval. For example, selection of bookmark selector 654 may cause video client 270 to add an indication of the advertisement to a bookmark list and store the advertising code and/or the advertisement in a local memory (e.g., memory 320). Return to program selector 656 may be selected by a user to return directly to primary content section 610, ending the telescoping advertising sequence. Additionally and/or alternatively, navigation within telescoping advertising sections/screens may be implemented via a designated "back" button on remote control 280.

Although FIG. 6 shows exemplary sections and menu selections of display 600, in other implementations, display 600 may contain fewer, different, differently arranged, or additional sections and menu selections than depicted in FIG. 6. For example, in another implementation, primary content section 610, secondary advertisement section 620, and tertiary advertisement section 630 may be presented as tabbed windows that can be selected by a user.

Figure 7:
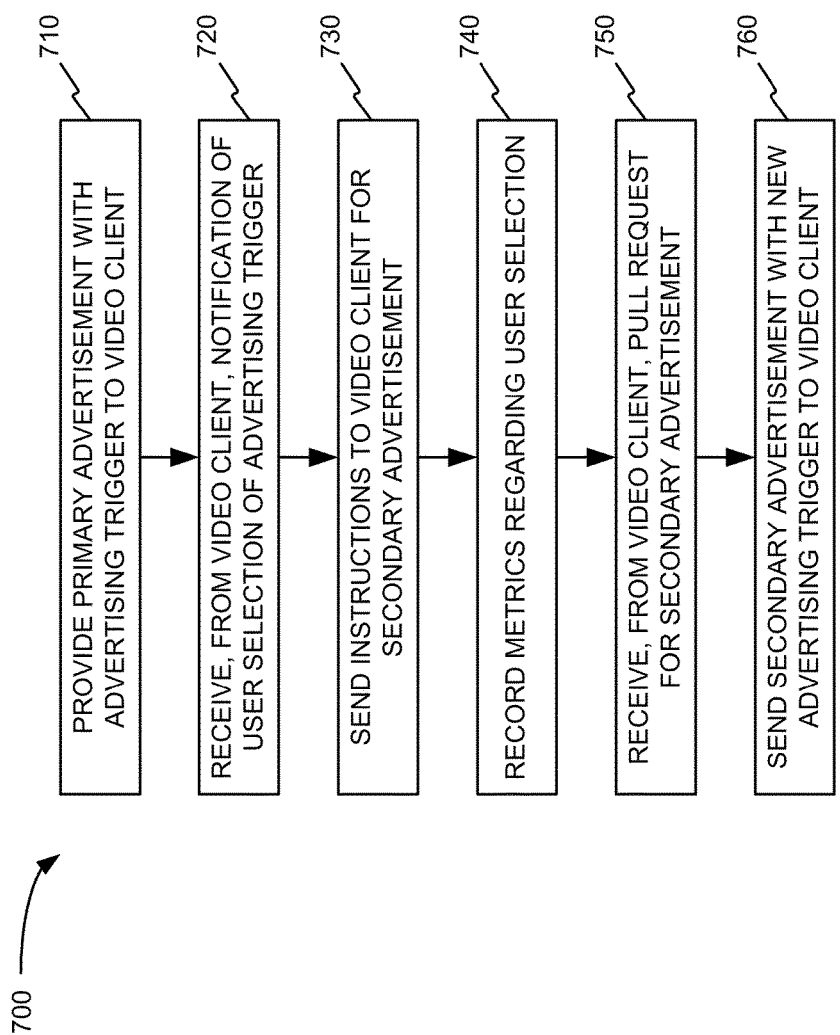
FIG. 7 is a flow chart illustrating an exemplary process for providing telescoping advertising.

FIG. 7 provides a flow chart of an exemplary process 700 for providing telescoping advertising. Some or all of process 700 may be performed by one or more servers associated with a subscription multimedia service, such as campaign manager 222 and/or content server 205. In some implementations, some or all of process 700 may also be performed by one or more video clients 270 in conjunction with servers associated with a subscription multimedia service.

Process 700 may include providing a primary advertisement with an advertising trigger to a video client (block 710). For example, as described above in connection with FIG. 5, content delivery system 210 may combine linear/interactive advertising content 510 with broadcast program content or other program content to form combined content 520 that may be forwarded to video client 270. The combined content 520 may be provided as a single video stream that includes a primary advertisement (e.g., primary advertisement 120) with an integrated trigger to a secondary advertisement (e.g., secondary advertisement trigger 130). In another implementation, content delivery system 210 may provide a primary advertisement that may later be associated with interactive program content by video client 270. Video client 270 may receive the combined content 520 and may display the combined content to a user (e.g., via video display device 275).

Notification of a user selection of the advertising trigger may be received from the video client (block 720). For example, as described above in connection with FIG. 5, video client 270 may identify the user selection and associate the user selection with an identification code for the primary advertisement and an identification code associated with the trigger for the secondary advertisement. Video client 270 may compile the primary advertisement identification code, the identification code associated with the trigger for the secondary advertisement, and other user/device identification information and send the compiled information to campaign manager 222, as indicated by reference number 540.

Returning to FIG. 7, instructions for a secondary advertisement may be sent to the video client (block 730). For example, as described above in connection with FIG. 5, campaign manager 222 may determine an appropriate response to the user selection information based on, for example, a dynamic set of advertising campaign rules and/or user profile information and prevailing environmental/contextual metrics (e.g., time of day, program being viewed, etc.). Campaign manager 222 may provide instructions to video client 270, as indicated by reference number 550. Campaign manager 222 may, for example, instruct video client 270 to pull additional advertising media (e.g., a secondary advertisement) from content server 205 and/or an executable application for presentation to the viewer.

Referring again to FIG. 7, metrics regarding the user's selection may be recorded (block 740). For example, as described above in connection with FIG. 5, campain manager 222 may capture metrics regarding user selection information 540. For example, campaign manager 222 may identify selection data, such as user selections, advertisement codes, contextual parameters, and/or other information that may be relevant to advertisers and/or system managers. Campaign manager 222 may send the selection data to another location, such as data logger 224, for storage, as indicated by reference number 560.

A pull request for a secondary advertisement may be received from the video client (block 750) and a secondary advertisement with another advertising trigger may be sent to the video client (block 760). For example, as described above in connection with FIG. 5, upon receipt of pull instructions 550, video client 270 may send a request 570 for secondary advertising content to content server 205 via content delivery system 210. In response to request 570 for secondary advertising content, content server 205 may retrieve the requested secondary advertisement (e.g., from linear advertising content database 230 and/or interactive advertising content database 235) and provide the requested secondary advertisement to video client 270 via content delivery system 210, as indicated by reference number 580. Alternatively and/or additionally video client 270 may pre-fetch secondary advertising content and retrieve a selected advertisement from a local memory cache (e.g., from memory 320) in response to the pull request.

FIG. 8 provides a flow chart of another exemplary process 800 for providing telescoping advertising. Some or all of process 800 may be performed by a video client associated with a subscription multimedia service, such as video client 270. In some implementations, some or all of process 800 may be performed by video client 270 in conjunction with one or more servers, such as content server 205 and/or campaign manager 222.

Process 800 may include receiving and presenting a primary advertisement with an advertising trigger (block 810). For example, video client 270 may receive from content delivery system 210 a primary advertisement included within a linear broadcast stream. In another implementation, video client 270 may request (e.g., based on user input via remote control 280) a particular primary advertisement from content server 205, such as a previously bookmarked advertisement selected from a list of bookmarked advertisements. The primary advertisement may include a hotspot 140 within the primary advertisement that includes a secondary advertisement trigger 130. The primary advertisement may be presented to the user on a display (e.g., video display 275).

A user selection of the advertisement trigger may be received (block 820) and the campaign manager may be notified of the user selection (bock 830). For example, video client 270 may receive a signal from remote control 280 to indicate selection of an advertisement trigger. In another implementation, the user's selection may be initiated via a keyboard, an input button the video client 270, or another device that allows for user input to video client 270. For example, a user may navigate through selectable of an interactive display (e.g., display 600) to identify and select an advertising trigger. In another implementation, a user may follow instructions within the advertising trigger to indicate a selection (e.g., "Press 'A'" on the remote control). Video client 270 may send an indication of the user selection to campaign manager 222. The indication may include, for example, an identifier of video client 270 (e.g., a unique identification number) and additional information (e.g., contextual information) to allow campaign manager 222 to best target the advertisement to the user.

Instructions for a secondary advertisement may be received (block 840). For example, video client 270 may receive instructions from campaign manager 222 to present a particular secondary advertisement or executable application. The instructions may include, for example, an advertisement code (e.g., a unique identification number), an IP address, or the like.

A secondary advertisement with an advertising trigger may be retrieved and presented (block 850). For example, video client 270 may send a pull request to content server 205 (e.g., via content delivery system 210) to retrieve the advertisement identified in the instructions from campaign manager 222. In another implementation, video client may retrieve, from a local memory, the advertisement identified in the instructions from campaign manager 222. For example, content server 205 may provide multiple advertisements along with the primary advertisement, such that video client 270 may locally store potential secondary advertisements. In still another implementation, video client 270 may receive the secondary advertisement from content server 205 and/or content delivery system 210 based on instructions by campaign manager 222, provided directly to content server 205 and/or content delivery system 210, to send the required additional advertising media to video client 270.

Primary content may be paused and/or recorded (block 860). For example, video client 270 may implement DVR capabilities to store linear programming content. In one implementation, primary advertisement 120 may be paused at the point in time at which a user selects secondary advertisement 130 and video client 270 may store subsequent linear content (e.g., program content and/or linear advertising) from that point in time forward.

It may be determined if an additional advertising trigger is selected (block 870). For example, video client may detect user input to another advertising trigger or to navigation overlay 650. If an additional advertising trigger is selected (block 870—YES), process 800 may return to block 830 to notify the campaign manager of the user selection.

If no additional advertising trigger is selected (block 870—NO), video client 270 may return to the previous content (block 880). For example, video client 270 may receive user input to a navigation overlay 650 selection to return to the previously interrupted advertisement or to the original primary advertisement. Additionally and/or alternatively, if no user input is received by the end of the presentation of a linear secondary advertisement, video client 270 may simply default back to the previously interrupted advertisement from the point of interruption. In another implementation, after completion of a secondary advertisement, video client 270 may return to the linear content stream in real-time.

Figure 9A:
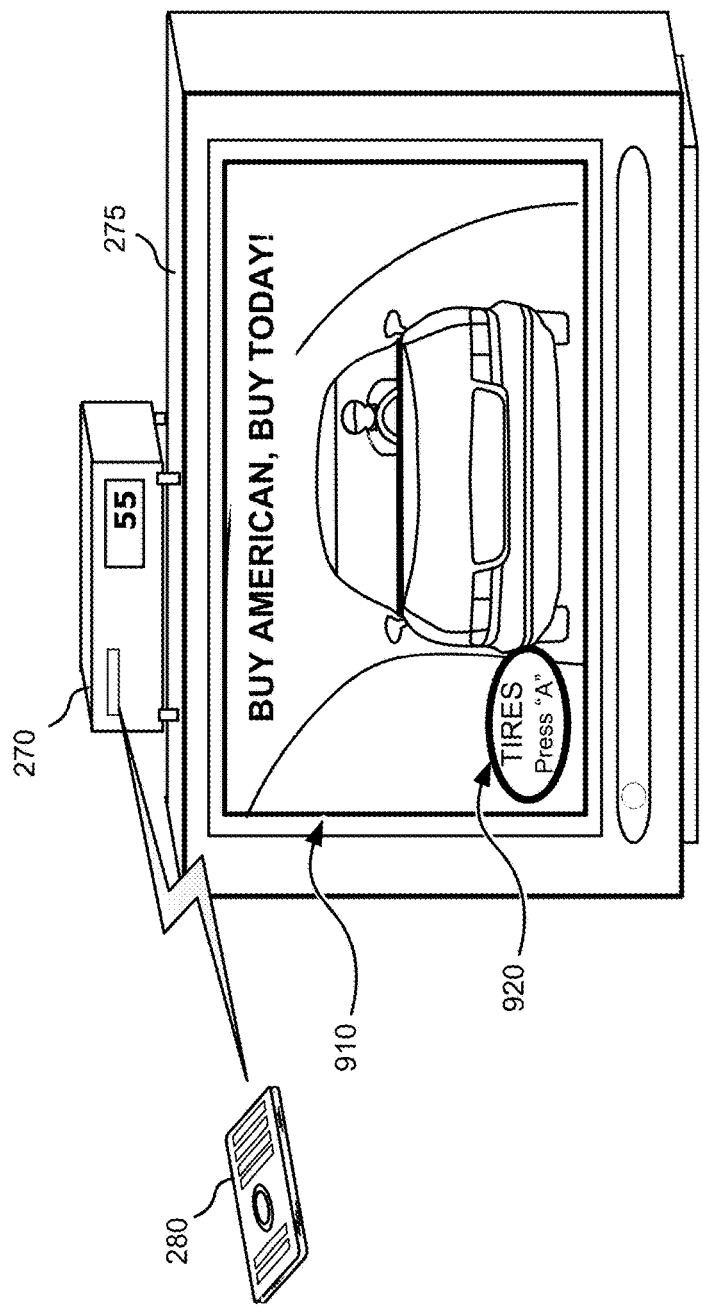
FIGS. 9A and 9B are exemplary diagrams illustrating implementations of a user interface for telescoping advertisements.
Figure 9B:
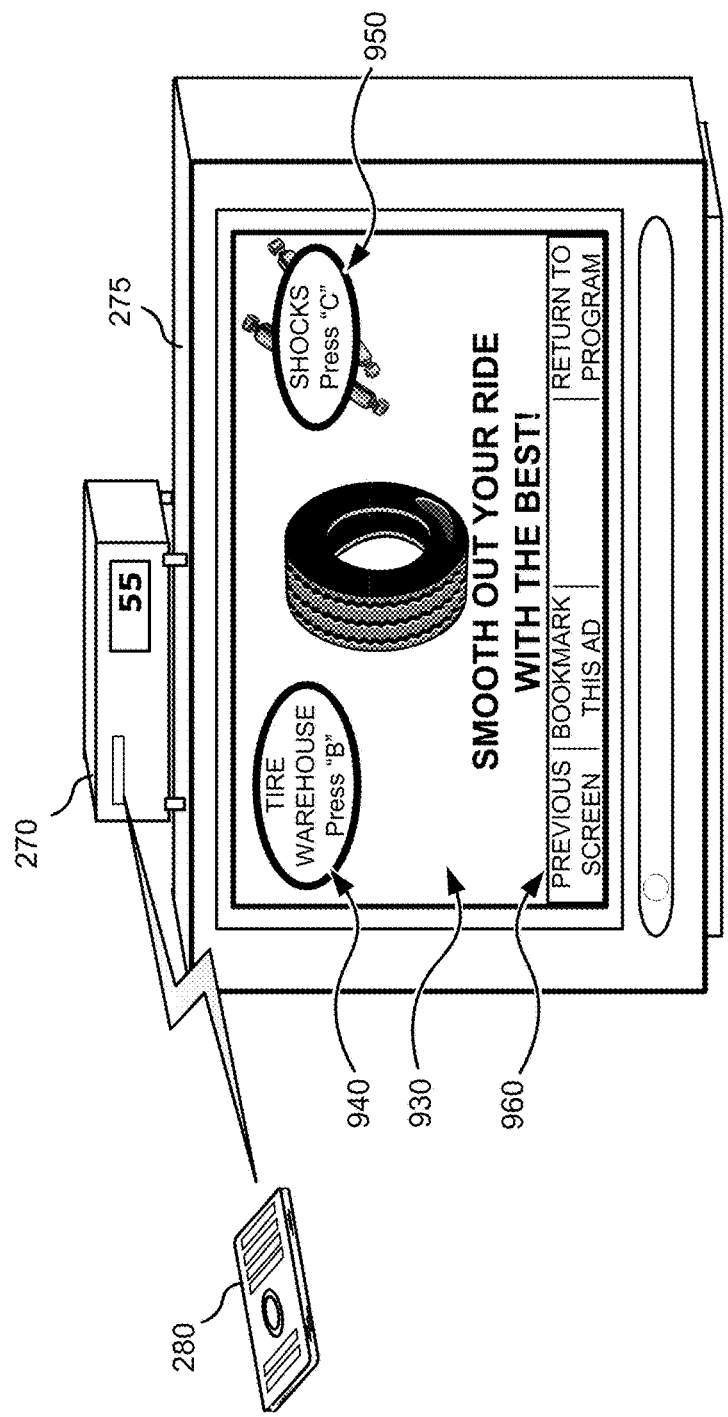

FIGS. 9A and 9B provide exemplary diagrams illustrating implementations of a user interface for telescoping advertisements. More specifically, FIG. 9A provides an exemplary diagram of an on-screen display that includes a primary advertisement, and FIG. 9B provides an exemplary diagram of an on-screen display that includes a selected secondary advertisement.

Referring to FIG. 9A, a viewer may view a display on video display device 275. While the viewer is watching a particular channel (e.g., channel "55"), a primary advertisement 910 is presented that includes a secondary advertising trigger 920. As shown in FIG. 9A, primary advertisement 910 may relate to a particular consumer product (e.g., an automobile), while secondary advertising trigger 920 may relate to an associated product (e.g., tires). In one implementation, the subject matter of secondary advertising trigger 920 may be pre-selected by the provider of the primary advertisement. In another implementation, advertising trigger 920 may be supplied by the subscription multimedia service provider based on, for example, user profile information associated with video client 270. The viewer may select secondary advertising trigger 920 (e.g., by pressing "A" on remote control 280).

In one implementation, selecting the trigger from advertisement 920 may cause video client 270 to interrupt the display of primary advertisement 910 and instead show a secondary advertisement related to secondary advertising trigger 920. In an exemplary implementation, content that continues to be broadcast on channel 55 after the user selects secondary advertising trigger 920 may be stored in a memory of video client 270 (e.g., using DVR functionality).

As shown in FIG. 9B, based on the user selection of secondary advertising trigger 920, a secondary advertisement 930 may be presented on display 275. Secondary advertisement 930 may include additional advertisement links 940 and 950. Secondary advertisement 930 may include a linear or non-linear presentation. Similar to secondary advertising trigger 920, additional advertising triggers 940 and 950 may be pre-selected by the advertiser and/or selected by the subscription multimedia service provider. Along with the display of secondary advertisement 930, a navigation overlay 960 may be included on display 275. Thus, a user may peruse additional advertising (e.g., by selecting "B" or "C" on remote control), or the user may use selections in navigation overlay 960 to return to programming on channel 55. If DVR functionality is enabled on video client 270, the user may have the option of returning to primary advertisement 910 from the point of interruption or resuming channel 55 programming at the current point in time.

The illustrations of FIGS. 9A and 9B provide exemplary formats for presenting telescoping advertisements. Other formats and variations may be used.

Implementations described herein may provide systems and/or methods that send, over a network, an advertisement for presentation by a video client, where the advertisement includes a trigger for secondary advertising content that is presented, within a hotspot designated in the primary advertisement, as part of the primary advertisement. One or more devices may receive, via the network, a notification from the video client that a user has selected the trigger and may determine, based on the notification, particular secondary advertising content to be presented to the user. The one or more devices may send, over the network, instructions to the video client to retrieve the particular secondary advertising content for presentation to the user. The particular secondary advertising content may include triggers for additional advertising that may be selected by the user.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while series of blocks have been described with regard to the flowcharts of FIGS. 7 and 8, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    receiving, by a campaign manager and from a video client, a notification that indicates a selection of a first trigger within a hotspot of an interactive display that includes first content that is being provided for display by the video client,
        the first content being related to a physical object,
        the hotspot being an icon overlaid on a component, of the physical object, shown within the interactive display, the hotspot including the first trigger at a first time during a presentation of the first content,
the hotspot including a second trigger at a second time during the presentation of the first content,
the second trigger being different from the first trigger,
the second time being different from the first time,
the hotspot tracking a location of the component on the interactive display while the first content is displayed, and
the hotspot being repositioned within the interactive display as the first content is displayed based on the tracking of the location of the component on the interactive display while the first content is displayed;
determining, by the campaign manager, a response to the selection of the first trigger within the hotspot of the interactive display based on a context relating to the video client; and
providing, by the campaign manager and to a content delivery system, instructions regarding second content, to be overlaid over the first content in the interactive display, based on determining the response to the selection of the first trigger within the hotspot of the interactive display,
the second content being related to the component of the physical object,
the instructions instructing the content delivery system to send the second content to the video client,
the instructions being received by the content delivery system, and
the second content being sent by the content delivery system to the video client based on the instructions.

2. The method of claim 1, further comprising:
identifying metrics based on information included in the notification, and
sending the metrics to a data logger of a data center that includes the campaign manager.

3. The method of claim 1, where the notification includes:
an identifier associated with the video client,
an identifier associated with the first content, and
an identifier associated with the first trigger.

4. The method of claim 1, where determining the response comprises applying information in the notification to:
a dynamic set of advertising campaign rules, or
metrics regarding a program being provided for display by the video client before providing the first content for display.

5. The method of claim 1, where the first content is included in a linear programming stream.

6. The method of claim 1, where the second content includes an interactive application.

7. A system comprising:
a campaign manager to:
receive, from a video client, a notification that indicates a selection of a first trigger within a hotspot of an interactive display that includes first content that is being provided for display by the video client,
the hotspot being an icon overlaid on a component, of a physical object, shown within the interactive display,
the hotspot including the first trigger at a first time during a presentation of the first content,
the hotspot including a second trigger at a second time during the presentation of the first content,
the second trigger being different from the first trigger,
the second time being different from the first time,
the hotspot tracking a location of the component on the interactive display while the first content is displayed, and
the hotspot being repositioned within the interactive display as the first content is displayed based on the tracking of the location of the physical object on the interactive display while the first content is displayed,
determine a response to the selection of the first trigger within the hotspot of the interactive display based on a context relating to the video client, and
send, to a content delivery system, instructions regarding second content, to be overlaid over the first content in the interactive display, based on determining the response to the selection of the first trigger within the hotspot of the interactive display,
the instructions instructing the content delivery system to send the second content to the video client,
the instructions being received by the content delivery system, and
the second content being sent by the content delivery system to the video client based on the instructions.

8. The system of claim 7, where the second content includes subject matter that is selected by a provider of the first content.

9. The system of claim 7, where the notification includes:
an identifier associated with the video client,
an identifier associated with the first content,
an identifier associated with the first trigger, and
an identifier of a channel being provided for presentation.

10. The system of claim 7, where the second content includes a different trigger for third content.

11. The system of claim 7, where, when determining the response, the campaign manager is to apply information in the notification to:
a dynamic set of advertising campaign rules, or
a user profile associated with the video client.

12. A method comprising:
receiving, by a video client and from a content delivery system, a stream of programming content that includes first content;
presenting, by the video client and, the first content within an interactive display and a first trigger for second content within a hotspot of the interactive display,
the hotspot being an icon overlaid on a component, of a physical object, shown within the interactive display,
the hotspot including the first trigger at a first time during a presentation of the first content,
the hotspot including a second trigger at a second time during the presentation of the first content,
the second trigger being different from the first trigger,
the second time being different from the first time, and
the hotspot tracking a location of the component within the interactive display while the first content is displayed;
repositioning, by the video client and based on the tracking of the location of the component within the interactive display, the hotspot within the interactive display while the first content is presented within the interactive display;
receiving, by the video client, an indication of a selection of the first trigger; and presenting, by the video client and based on the selection of the first trigger, the second content overlaid over a portion of the first content within the interactive display.

13. The method of claim 12, where receiving the second content includes:
    receiving, from a campaign manager, instructions to retrieve the second content,
    sending, based on the instructions and to the content delivery system, a request for the second content, and
    receiving the second content from the content delivery system.

14. The method of claim 12,
    where the second content includes a different trigger for third content,
    where the method further comprises:
        receiving a different indication of a different selection of the different trigger for the third content;
        pausing the presenting of the second content at a different point of the second content after receiving the different indication of the different selection of the different trigger;
        presenting, after pausing the presenting of the second content at the different point of the second content and based on receiving the different indication of the selection of the different trigger, the third content overlaid over a portion of the second content within the interactive display; and
        resuming the presenting of the second content from the different point of the second content after the presenting of the third content is complete,
    where the portion of the first content within the interactive display being less than all of the first content within the interactive display, and
    where the portion of the second content within the interactive display being less than all of the second content within the interactive display.

15. The method of claim 12,
    pausing the presenting of the first content at a particular point of the first content after receiving the indication of the selection of the first trigger;
    generating a recording of the first content from the particular point of the first content based on receiving the indication of the selection of the first trigger;
    determining that additional input is not received between a point of interruption and an end of the presenting of the second content; and
    automatically resuming, by using the recording of the first content, the presenting of the first content from the particular point of the first content based on determining that the additional input is not received between the point of interruption and the end of the presenting of the second content.

16. The method of claim 12, further comprising:
    receiving a selection of a bookmark selector from a navigation overlay of the interactive display;
    storing, based on the selection of the bookmark selector, an indication of first content, being displayed by the video client, in a bookmark data structure; and
    providing, based on the bookmark data structure, a request for previously bookmarked content before receiving the stream of programming content that includes the first content,
    the first content being the previously bookmarked content.

17. A system comprising:
    a memory; and
    a processor to:
        present first content within an interactive display and a first trigger for second content within a hotspot of the interactive display,
            the hotspot being an icon overlaid on a component, of a physical object, shown within the interactive display,
            the hotspot including the first trigger at a first time during a presentation of the first content,
            the hotspot including a second trigger at a second time during the presentation of the first content,
            the second trigger being different from the first trigger, and
            the second time being different from the first time;
        track a location of the component on the interactive display while the first content is presented;
        reposition the hotspot within the interactive display as the first content is presented based on tracking the location of the component on the interactive display while the first content is presented;
        receive an indication of a selection of the first trigger for the second content; and
        present, within the interactive display and based on the selection of the first trigger for the second content, the second content.

18. The system of claim 17,
    where the second content includes a different trigger for an advertisement, and
    where the processor is further to:
        receive a different indication of a different selection of the different trigger for the advertisement; and
        pause the presenting of the second content after receiving the different indication of the different selection of the different trigger for the advertisement.

19. A non-transitory computer-readable medium storing instructions, the instructions comprising:
    one or more instructions that, when executed by at least one processor of a campaign manager, cause the at least one processor to:
        receive, from a video client, a notification that indicates a selection of a first trigger within a hotspot of an interactive display that includes first content that is being provided for display by the video client,
            the hotspot being an icon overlaid on a component, of a physical object, shown within the interactive display,
            the hotspot including the first trigger at a first time during a presentation of the first content,
            the hotspot including a second trigger at a second time during the presentation of the first content,
            the second trigger being different from the first trigger,
            the second time being different from the first time,
            the hotspot tracking a location of the component on the interactive display while the first content is displayed, and
            the hotspot being repositioned within the interactive display as the first content is displayed based on the tracking of the location of the physical object on the interactive display while the first content is displayed;
        determine a response to the selection of the first trigger within the hotspot of the interactive display; and
        send, to a content delivery system and based on determining the response to the selection of the first trigger, particular instructions regarding second content, the particular instructions instructing the content delivery system to send the second content to the video client, the particular instructions being received by the content delivery system, and the second content being sent by the content delivery system to the video client based on the particular instructions.

20. The non-transitory computer-readable medium of claim 19, where the one or more instructions to determine the response include:

one or more instructions that, when executed by the at least one processor, cause the at least one processor to:
determine the response based on a dynamic set of advertising campaign rules and a time of day.

21. The non-transitory computer-readable medium of claim 19, where the instructions further comprise:

one or more instructions that, when executed by the at least one processor, cause the at least one processor to:
store metrics based on information included in the notification,
the metrics including an advertisement code and a contextual parameter, and
the contextual parameter including information identifying a program being viewed by a user of the video client.

22. The non-transitory computer-readable medium of claim 19, where the first content includes a first advertisement for a particular retail establishment, where the second content includes a second advertisement for a particular good sold by the particular retail establishment, and where the physical object is the particular good.

23. The non-transitory computer-readable medium of claim 19, where the content delivery system retrieves the second content from a content server based on the particular instructions.

* * * * *